March 4, 1969     L. A. BOTKIN     3,430,648

VENT CHECK VALVE

Filed Aug. 19, 1966

INVENTOR.
Lawrence A. Botkin
BY
Carness Dickey & Pierce
ATTORNEYS

United States Patent Office 3,430,648
Patented Mar. 4, 1969

3,430,648
VENT CHECK VALVE
Lawrence A. Botkin, Omaha, Nebr., assignor to Fruehauf Corporation, Detroit, Mich., a corporation of Michigan
Filed Aug. 19, 1966, Ser. No. 573,626
U.S. Cl. 137—493
Int. Cl. F16k 45/00
2 Claims

ABSTRACT OF THE DISCLOSURE

A combination vent check valve assembly comprising housing means defining a first generally radially extending valve seat section, hub means disposed centrally of the housing means and defining a second valve seat section comprising first and second axially spaced, generally radially extending valve seat portions, a valve member extending between the housing means and the hub means and having first and second radially spaced valve portions, the valve member being movable in response to a preselected differential pressure condition between a first position wherein the valve portions are engaged one with the first valve seat section and one with the second valve seat section so as to block communication between the housing and hub means, and a second position wherein either of the valve portions is disengaged from the adjacent of the valve seat sections, whereby to vent one side of the valve member with the opposite side thereof.

---

This invention relates generally to check valves and the like and, more particularly, to new improved combination check valve and vent assembly.

It is a general object of the present invention to provide a new and improved combination vent and check valve assembly which is adapted to vent the area below the assembly with the area thereabove but prevent fluid flow through the assembly in the event a preselected differential pressure condition exists across the assembly.

It is another object of the present invention to provide a new and improved vent check valve assembly of the above character which is of an extremely simple design and is therefore easy to assemble and economical to commercially manufacture.

It is still another object of the present invention to provide a new and improved vent check valve assembly of the above character which is extremely durable in operation.

It is a further object of the present invention to provide a new and improved vent check valve assembly which may be used in a wide variety of operational environments and is therefore characterized by universality of application.

It is a further object of the present invention to provide a new and improved vent check valve assembly having a disk-like valve member which is adapted to be easily removed for purposes of cleaning, replacement and the like.

In accordance with the principles of the present invention, the foregoing and other objects and advantages are attained through a novel valve assembly incorporating an annular disk shaped valve member which is supported with respect to a plurality of associated valve seats such that the area below the valve member may be vented with the area above the assembly, but which is sealingly engaged with the valve seats in the event there is a momentary pressure surge below the assembly or in the event the enclosure in which the assembly is mounted overturns or is similarly upset. The valve assembly of the present invention is adapted to find particularly useful application in mobile containers that must be vented to the atmosphere, yet must be leakproof when they are oriented in different positions during transport thereof. Another application for the combination vent check valve assembly of the present invention is in manhole covers for sewers or the like wherein the assemblies function to vent the sections of the sewers below the associated manholes with the atmosphere, but prevent any fluid egress through the covers in the event there is a pressure surge within the adjacent sewer.

Figure 1:
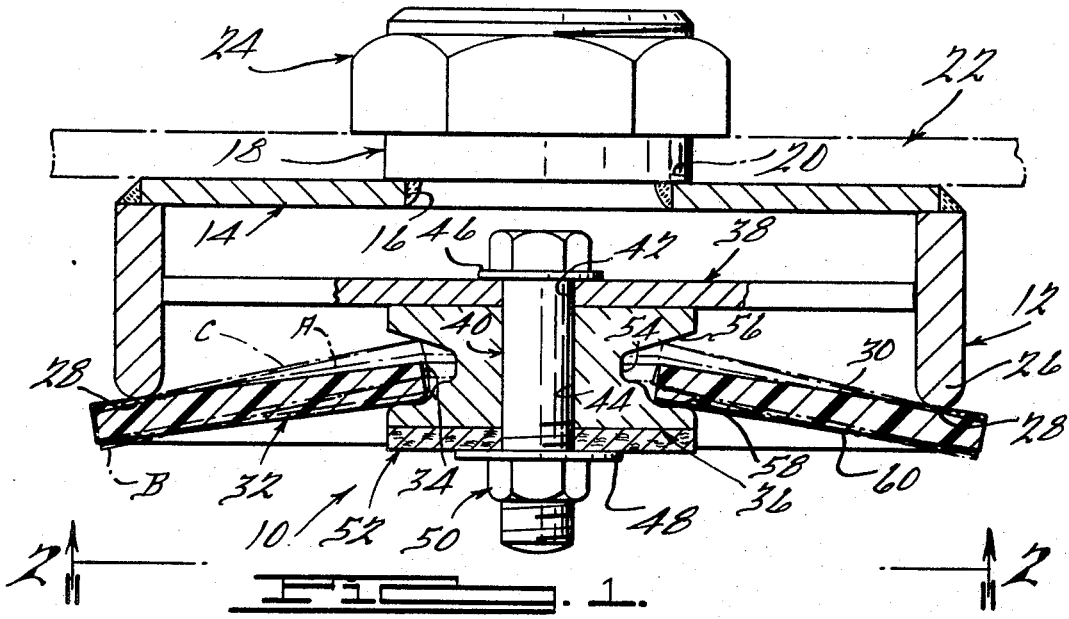
Figure 2:
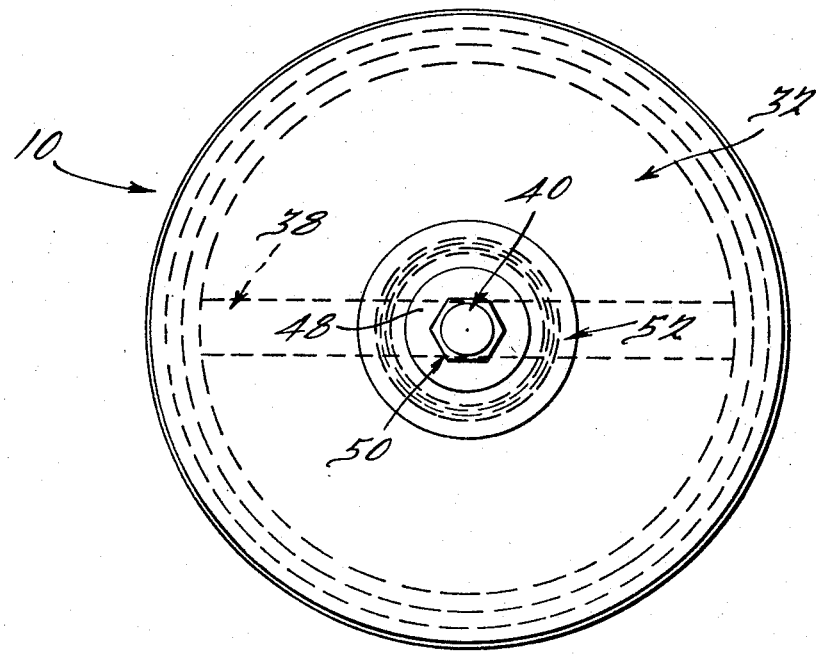

A more complete understanding of the present invention and other objects and features thereof will be obtained from the following detailed description taken in conjunction with the accompanying drawing, wherein:

FIGURE 1 is a transverse cross sectional view of a combination vent check valve assembly in accordance with an exemplary embodiment of the present invention; and FIGURE 2 is a bottom elevational view of the assembly illustrated in FIGURE 1, as taken substantially along the line 2—2 thereof.

Referring now to the drawing, a combination vent check valve assembly 10, in accordance with an exemplary embodiment of the present invention, is shown as comprising a generally cylindrical housing or casing 12 which is secured as by welding or the like to the lower side of a flat, transversely or horizontally extending mounting plate 14. The plate 14 is formed with a central opening 16 within which an upwardly extending cylindrical mounting sleeve or collar 18 is rigidly secured as by welding or the like. The sleeve 18 is preferably externally threaded and extends upwardly through a complementary shaped opening 20 formed in the upper end of the particular enclosure or the like 22 in which the assembly 10 of the present invention is operatively mounted. A suitable retaining nut or the like 24 is threaded on the upper end of the sleeve 18 to fixedly secure the assembly 10 to the lower side of the enclosure member 22 in a manner such that the interior of the housing 12 is communicable with or vented to the atmosphere above the member 22 through the sleeve 18 and the opening 16 in the plate 14.

The lower end of the housing 12 is formed with a generally rounded or semicircular portion 26 which defines a valve seat surface 28 adapted to be engaged by the upper side 30 of an annular disk-shaped valve member, generally designated 32. The member 32 is preferably fabricated of neoprene rubber, but may be constructed of any other suitable material that is generally resilient in character and is impervious to the material contained within the associated enclosure, for example, a flexible synthetic plastic or the like. The valve member 32 is formed with a central opening 34 and is supported adjacent the lower end of the housing 12 by means of an annular hub member which extends through the opening 34 and is generally designated by the numeral 36. As best seen in FIGURE 1, the hub member 36 is mounted coaxially of the housing 12 by means of a diametrically extending mounting bar 38 that is rigidly secured at its opposite ends to the inner periphery of the housing 12, as by welding or the like. The hub member 36 is secured to the lower side of the mounting bar 38 by a suitable screw, bolt or the like 40 which extends axially through aligned apertures 42 and 44 formed in the bar 38 and hub member 36, respectively. A conventional lockwasher 46 is provided between the head of the bolt 40 and the top of the bar 38 and a suitable washer 48 and nut 50 are mounted on the opposite (lower) end of the bolt 40, as illustrated. Means in the form of a cork or similar type gasket 52 is interposed between the lower side of the hub member 36 and the washer 48 to provide a fluid-tight seal at the lower end of the opening 44.

The hub member 36 is formed with an annular recess 54 around the outer periphery thereof, which recess 54 is adapted to receive the inner periphery of the valve member 32 therewithin. As best seen in FIGURE 1, the recess defines a radially inwardly and downwardly inclined upper valve seat section 56 which is adapted to be engaged by the upper surface 30 of the valve member 32 during operation of the assembly 10, as will later be described. The recess 54 also defines a generally arcuate-shaped radially inwardly extending lower valve seat section 58 which is adapted to be engaged by the lower side 60 of the valve member 32. It will be noted that the radially innermost portion of the recess 54 is spaced radially inwardly with respect to the inner periphery of the valve member 32 and that the upper and lower valve seat sections 56 and 58 are spaced axially from each other a sufficient amount to permit the inner periphery of the valve member 32 to move freely or "float" between the valve seat sections 56 and 58 without any interference between the periphery of the opening 34 and the adjacent surface portions of the recess 54. It will also be noted that by virtue of the fact that the annular recess 54 in the hub member 36 is spaced axially above the valve seat 28 formed on the lower end of the housing 12, the valve member 32 assumes the generally frustoconical configuration so that the outer periphery of the valve member 32 is normally urged upwardly against the valve seat 28 in the manner illustrated in FIGURE 1.

It may be further noted that the mounting plate 14 and housing 12 may be of a one piece stamped metal construction having the hub member 36 secured, as by welding or the like, directly to the lower side thereof, whereby to materially reduce the expense of manufacturing the assembly 10. Also, it is contemplated for certain applications that the valve member 32 be fabricated of a nonflexible material such as metal; however, such an arrangement would require that the hub member 36 be of a two-piece construction to facilitate assembly.

In operation, assuming that substantially equal pressure conditions exist across the assembly 10, the valve member 32 will assume the position indicated by the solid lines in FIGURE 1. In the event there is a slight pressure increase within the associated enclosure, i.e., below the assembly 10, the inner periphery of the valve member 32 will move slightly upwardly to the phantom position indicated A, thereby communicating the area below the valve member 32 with the interior of the housing 12 and hence with the atmosphere above the enclosure member 22. In the event a slight vacuum condition exists within the interior of the enclosure, the outer periphery of the valve member 32 will move downwardly to the phantom position B illustrated in FIGURE 1, whereby the interior of the enclosure will be communicable with the atmosphere through the sleeve 18 and housing 12, hence equalizing the pressure across the assembly 10.

At such time as there is a momentary or permanent pressure surge within the enclosure in which the assembly 10 is operatively mounted, the inner periphery of the valve member 32 will move upwardly to the phantom position C until the upper surface 30 thereof engages the upper valve seat section 56 and the outer periphery of the valve member 32 will be urged upwardly against the valve seat 28, thereby providing a fluid-tight seal to prevent any fluid egress through the assembly 10. Similarly, if the associated enclosure is overturned or otherwise upset, as might occur during transport of the subject enclosure, the valve member will move to the phantom position C, thereby preventing any fluid flow through the assembly 10. At such time as the enclosure is placed in an upright position, the valve member 32 will assume the position indicated in solid lines in FIGURE 1 and thereby function to selectively vent the interior of the enclosure with the atmosphere, as above described. It will be noted that the valve member 32, by virtue of its flexible construction, may be easily removed from the housing 12 for purposes of cleaning, replacement and the like. This is of particular importance when the valve assembly 10 is used for venting containers of contaminable materials such as milk and the like.

It will be seen from the above description of the combination vent check valve assembly 10 that the present invention provides a novel device for venting an enclosure or the like with the atmosphere in event there is any change in differential pressure across the valve member 32, and that in the event there is a relatively large pressure surge within the associated enclosure, the valve member 32 will move to a position precluding fluid egress from the enclosure. The subject construction will find particularly useful application in mobile tanks or similar type containers used in the transport of virtually all types of fluid substances on trucks, railroad cars and related types of vehicles. The subject construction will also find useful application in venting various types of underground conduits, such as sewers and the like where the valve assembly 10 may be mounted in a manhole cover and function to vent the interior of the sewers, yet prevent any fluid egress therefrom in the event a sudden fluid pressure surge occurs.

What is claimed is:

1. A combination vent check valve assembly comprising
    housing means defining a first generally radially extending valve seat section,
    hub means disposed centrally of said housing means and defining a second valve seat section comprising first and second axially spaced, generally radially extending valve seat portions,
    a valve member extending between said housing means and said hub means and having first and second radially spaced valve portions,
    said valve member being movable in response to a preselected differential pressure condition between a first position wherein said valve portions are engaged one with said first valve seat section and one with said second valve seat section so as to block communication between said housing and hub means, and a second position wherein either of said valve portions is disengaged from the adjacent of said valve seat sections, whereby to vent one side of said valve member with the opposite side thereof.

2. An assembly as set forth in claim 1 wherein the radially innermost of said valve portions is disengaged from both of said valve seat portions when a differential pressure condition of a first magnitude exists across said valve member and the radially outermost of said valve portions is disengaged from said first valve seat section when a differential pressure condition of a second magnitude exists across said valve member.

References Cited

UNITED STATES PATENTS

| 3,150,683 | 9/1964 | Carolan | 137—493 |
| 3,179,122 | 4/1965 | Wasdell | 137—493 |

FOREIGN PATENTS

| 76,115 | 7/1959 | France. |

M. CARY NELSON, *Primary Examiner.*

ROBERT J. MILLER, *Assistant Examiner.*

U.S. Cl. X.R.

173—43, 516.25